(No Model.)
F. A. FOSTER.
SAFETY DEVICE FOR BREAKDOWN GUNS.
No. 545,355.  Patented Aug. 27, 1895.
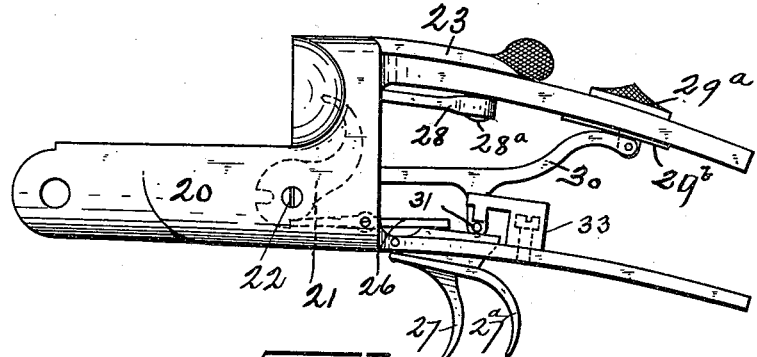
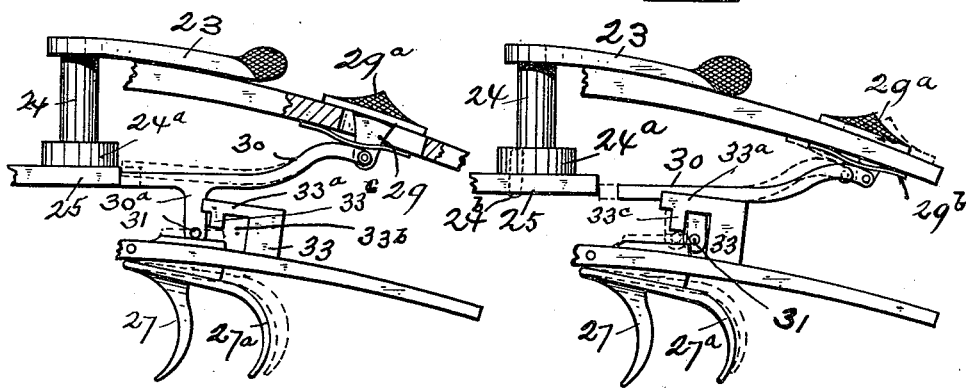
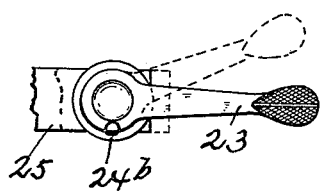
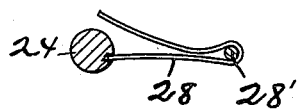
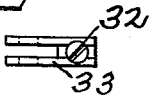
Witnesses
Inventor,
Frank A. Foster,
By Attorney
Frank H. Allen.

UNITED STATES PATENT OFFICE.

FRANK A. FOSTER, OF NORWICH, CONNECTICUT, ASSIGNOR TO THE CRESCENT FIRE ARMS COMPANY, OF SAME PLACE.

SAFETY DEVICE FOR BREAKDOWN GUNS.

SPECIFICATION forming part of Letters Patent No. 545,355, dated August 27, 1895.

Application filed September 18, 1894. Serial No. 523,351. (No model.)

*To all whom it may concern:*

Be it known that I, FRANK A. FOSTER, a citizen of the United States, residing at Norwich, in the county of New London and State of Connecticut, have invented certain new and useful Improvements in Firearms, which improvements are fully set forth and described in the following specification, reference being had to the accompanying sheet of drawings.

This invention relates particularly to breakdown hammerless guns, and has for its object to provide a simple and effective "safety" device by means of which the triggers may be positively locked to prevent the accidental discharge of the arm, but which device may also be conveniently thrown out of use whenever it is desired to close the loaded barrels without cocking the hammers, or when, for any reason, the "safety" is not needed.

In many of the guns of this class safety devices are provided that are automatically actuated by the sliding barrel-bolt to "lock" the triggers and prevent accidental discharge of the arm, the said lock being thrown out of operation by a suitable thumb-piece usually mounted to slide on the upper tang of the breech-frame; but in most of such arms no provision is made for rendering the safety device inoperative. My present invention makes such provision, and by very simple means renders it possible to use or dispense with the safety device at will.

The annexed drawings illustrate those portions of a breakdown hammerless gun that are connected with or affected by my invention.

Figure 1 is a side elevation of a breech-frame, having mounted therein the hammers, sears, triggers, top-snap, and safety device, the latter being shown as moved to lock the triggers. Figs. 2 and 3 show the top-snap and connected sliding barrel-bolt, the triggers and safety, the latter being shown in Fig. 2 as if pushed forward to allow the arm to be discharged, leaving the safety in proper position to be acted upon by the barrel-bolt when the barrels are again opened to reload. In Fig. 3 said safety is shown in its inoperative position—that is to say, as if thrown entirely out of use, making the arm for the time as if unprovided with a safety device. Fig. 4 is a plan view of the top-snap, Fig. 5 a plan of the top-snap spring, and Fig. 6 a plan view of a bracket 33, that forms an important element of my invention. Fig. 7 is a plan of a spring used in connection with the exposed thumb-piece by means of which the safety is operated.

In the drawings, the reference-figures 20 indicate the breech-frame, and 21 one of the hammers mounted within said frame on a pivot-screw 22 in the usual manner, said hammer being indicated by dotted lines in the drawings.

23 denotes the top-snap lever, the same being provided with a stem 24 that is seated in the center of the frame immediately in the rear of the recoil-shield, the lower end of said stem being formed with an enlarged head portion 24$^a$ that has secured therein a downwardly-projecting pin, (shown at 24$^b$ in Figs. 3 and 4,) which pin enters a corresponding hole in the longitudinally-movable barrel-bolt 25, located just beneath the said enlargement 24$^a$, in such manner that the partial rotation of the stem 24 will result in sliding the barrel-bolt 25 rearward, as will be seen in dotted lines in Fig. 4.

26 indicates one of the sears, and 27 27$^a$ the triggers, all of the elements thus far described being substantially as in double-barrel breakdown guns of this class.

The top-snap stem is rocked to hold the lever 23 in its normal closed position by a bow-spring 28, secured to the under side of the upper tang of the breech-frame by a screw 28$^a$, one limb of said spring bearing against a recess in the frame and the other limb bearing in a notch or recess in the circumference of said stem, as in Fig. 5. Said upper tang is slotted slightly in the rear of the free end of lever 23 to receive a thin plate 29, formed with a head portion 29$^a$, that lies upon the outer face of the tang and is of sufficient length to cover the described slot when the plate 29 is slid in either direction.

Pivoted to the inner end of the plate 29 is an arm 30, which curves downward and extends forward to a point near the rear end of the barrel-bolt 25, the arm 30 being of such length that when pushed forward its end lies in the path of said bolt as the latter moves to unlock the barrels. A slotted flat spring 29$^b$ straddles the plate 29 between the pivoted end of the arm 30 and the under side of the tang, and serves as a frictional brake or drag to hold the thumb-piece 29$^a$ in any desired position. The bowed central part of said spring bears upon the arm 30 just forward of the pivotal point of the latter, and thus acts with a constant tendency to force the free end of said arm downward, yet allows said arm to be raised, as in dotted lines, Fig. 2, under certain conditions hereinafter explained. The arm 30 is formed with a downwardly-projecting portion 30$^a$, which bears a pin 31, whose ends, projecting laterally like trunnions, rest immediately on the triggers, and, being forced downward by the spring 29$^b$, as above explained, said trunnions perform the work of trigger-springs.

Secured by a screw 32 to the lower tang of the frame is a stand 33, whose upper portion extends forward and overhangs the rear portion of the triggers, as at 33$^a$, said overhanging portion being formed with a notch 33$^b$, located just at the rear of said trigger, and with a projection 33$^c$, immediately over or opposite the triggers. The overhanging portion 33$^a$ is slotted, as best seen in Fig. 6, to receive and guide the projection 30$^a$ as the arm 30 is moved forward or rearward. When said arm is in its extreme forward position, as in full lines, Fig. 2, the laterally-projecting ends of the pin 31 are so far forward of the overhanging piece 33$^a$ that said pins and the arm to which they are connected may be readily forced upward by the triggers if it is desired to discharge the arm. When, however, the top-snap lever 23 is swung to withdraw the barrel-bolt 25 the arm 30 is forced rearward and the ends of the pin 31 are then interposed between the triggers and the opposing projection 33$^c$ on said overhanging projection, the pin ends or trunnions serving as wedges or blocks to prevent the use of the triggers. (See Fig. 1.) Said trunnions are forced into the last described position every time the barrels are opened if the arm 30 is in its forward position, and it then becomes necessary to slide the trunnions from beneath the projection 33$^c$ before the arm can be discharged; but should it be desired to render the safety device inoperative, such a result may be reached by simply sliding the thumb-piece 29$^a$ and the connected arm 30 rearward, which action moves the pins 31 out from between the triggers and the opposing projection 33$^c$ into the notch 33$^b$. The triggers may then be freely operated, the said pins rising in said notch as the triggers are pulled off to discharge the arm.

The described "inoperative" position of the safety device makes it possible to close the barrels without cocking the hammers, it being only necessary to pull the triggers and hold the sears out of engagement with the hammers during the closing movement of the barrels. As the barrels swing into locking engagement with the frame, the hammers, being no longer restrained by the sears, swing forward on their pivots to their closed positions, and cannot be again cocked except by "breaking down" the barrels.

The mechanism which I have provided in connection with my described safety is exceedingly simple, not easily disarranged or worn out, and provides without expense an excellent form of trigger-spring.

I claim as new and desire to secure by Letters Patent—

1. In a fire arm of the herein described class, the combination, with a movable thumb piece, of a lever pivotally secured thereto at one end, the opposite end of said lever being in the path of the barrel bolt, and the intermediate portion being provided with a downwardly projecting portion, a pin on each side of said portion, and a standard secured to the lower tang of the frame and provided with an overhanging portion which is slotted and provided with a downward projection, substantially as set forth.

2. In a fire arm of the herein described class, the combination, with a movable thumb piece provided with a plate to project through the upper tang, of a lever pivotally secured to the projecting portion, the opposite end of the lever being provided with a downwardly projecting portion, a standard rigidly secured to the lower tang, and a bow spring between the upper tang and the lever with its bowed portion in engagement with the lever forward of the pivotal point, whereby the spring acts as a break for the thumb piece and also forces the free end of the lever downward, substantially as set forth.

FRANK A. FOSTER.

Witnesses:
FRANK H. ALLEN,
LILA D. PEALE.